United States Patent [19]
Chookazian

[11] 3,779,564
[45] Dec. 18, 1973

[54] GASKET FOR JOINING PLASTIC TUBES

[75] Inventor: Mark Chookazian, Paramus, N.J.

[73] Assignee: EMA Bond Inc., Englewood, N.J.

[22] Filed: July 10, 1972

[21] Appl. No.: 269,936

[52] U.S. Cl............ 277/80, 161/42, 161/168, 277/205, 277/206, 277/227, 277/DIG. 2
[51] Int. Cl........................ F16j 9/20, F16j 15/14
[58] Field of Search............... 277/80, 205, 206, 277/227, DIG. 2; 161/42, 168

[56] References Cited
UNITED STATES PATENTS

| | | | |
|---|---|---|---|
| 2,589,766 | 3/1952 | Bernstein | 277/227 |
| 3,179,427 | 4/1965 | Pizzo | 277/206 |
| 3,620,875 | 11/1971 | Guglielmo, Sr. | 156/272 |
| 3,653,672 | 4/1972 | Felt | 277/205 |

*Primary Examiner*—William J. Van Galen
*Attorney*—K. E. Prince et al.

[57] ABSTRACT

An induction heat sealable gasket made from a thermoplastic material having ferromagnetic particles uniformly dispersed therein, the gasket comprising a ring base, a first wing extending upward and outward from the ring base, and a second wing extending upward from the ring base.

10 Claims, 9 Drawing Figures

GASKET FOR JOINING PLASTIC TUBES

BACKGROUND OF THE INVENTION

This invention is directed to a gasket. More particularly it is directed to a thermoplastic gasket excellently adapted for connecting thermoplastic tubes, hoses, or pipes.

Compositions of matter excellently adapted for preparing gaskets are taught by U.S. Pat. No. 3,620,875 (Guglielmo et al. 156/272). I have found that said compositions are also excellently adapted for making the gasket of this invention; hence, said patent is incorporated herein by reference. A gasket made of any of said compositions can, by the use of electromagnetic (induction) heating methods, be readily bonded to each of two plastic tubes or plastic pipes (or a plastic tube and a plastic pipe) to form a water tight or fluid tight bond or seal which will withstand a pressure of at least 100 psia, thereby to securely attach the tubes together in a water tight union.

SUMMARY OF THE INVENTION

In summary this invention is directed to a thermoplastic induction heat sealable gasket made from (contructed of or comprising) a thermoplastic material having ferromagnetic particles uniformly dispersed therein, said gasket comprising a ring base (6 of FIGS. 6, 7, and 8) having an outer periphery (7 of FIG. 6) and an inner periphery (8 of FIG. 6), a first wing (4 of FIGS. 7 and 8) attached to the ring base and extending upward and outward from the outer periphery, and a second wing (5 of FIGS. 7 and 8) attached to the ring base and extending upward from the inner periphery.

DESCRIPTION OF PREFERRED EMBODIMENTS

Figure 7:
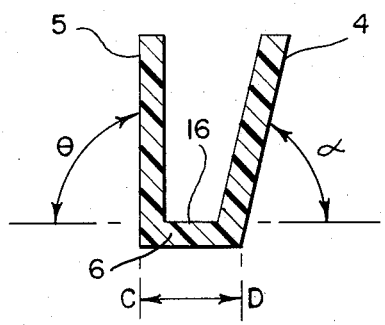
FIG. 7 is a view of the gasket of this invention cut along line 7—7 of FIG. 3.
Figure 8:
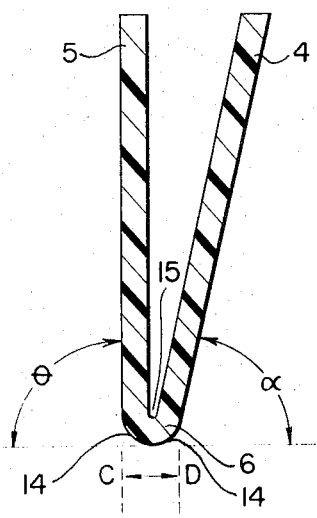
FIG. 8 is a view of a preferred embodiment of the gasket of this invention cut along line 7—7 of FIG. 3.

In preferred embodiments of the thermoplastic gasket recited in the above Summary and in Embodiment A, infra:

1. The angle $\alpha$ of FIGS. 7 and 8 is about 45°–85° (more preferably about 75°–85°).
2. The angle $\theta$ of FIGS. 7 and 8 is about 45°–90° (more preferably about 75°–90° and for optimum results about 90°).
3. The ferromagnetic particles pass about a 20 mesh screen and are retained on about a 325 mesh screen.
4. The ferromagnetic particles comprise about 10.5–18.5 percent (more preferably about 13.5–15 percent) by volume of the gasket.

In another preferred embodiment ("Embodiment A") this invention is directed to an improvement in an induction heat sealable thermoplastic gasket comprising a thermoplastic material in which there is uniformly dispersed ferromagnetic particles (i.e., the gasket is constructed of the thermoplastic material in which the ferromagnetic particles are uniformly dispersed), the improvement comprising the gasket having a ring base with an outer periphery and an inner periphery, a first wing attached to the ring base and extending upward and outward from the outer periphery, and a second wing attached to the ring base and extending upward from the inner periphery (i.e., the gasket is constructed so that it will comprise a ring base (6 of FIGS. 6, 7, and 8) with an outer periphery (7 of FIG. 6) and an inner periphery (8 of FIG. 6), a first wing (4 of FIGS. 7 and 8) attached to the ring base and extending upward and outward from the outer periphery, and a second wing (5 of FIGS. 7 and 8) attached to the ring base and extending upward from the inner periphery.

Figure 9:
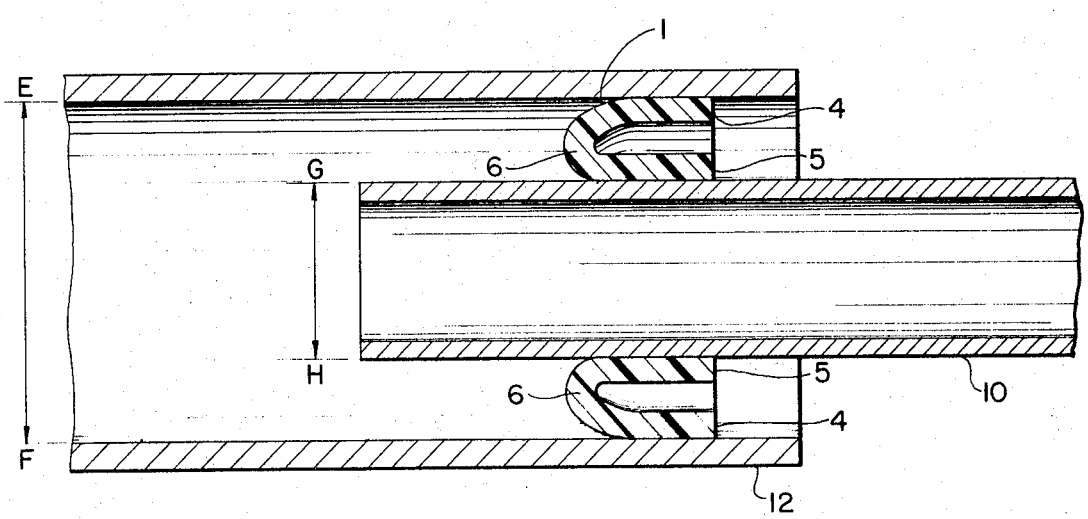
FIG. 9 shows in cross section, two thermoplastic pipes (or hoses or tubes) bonded together with the gasket of FIG. 8.

In specially preferred embodiments of my invention as set forth in the above Summary set forth in Embodiment A, supra, the bottom portion of the outer periphery of the ring base (6 of FIGS. 8 and 9) is rounded (as shown at 14 in said FIG. 8) to facilitate easy entry of the gasket into the outer tube (12 of FIG. 9).

DETAILED DESCRIPTION OF THE INVENTION

The instant invention is an improved induction heat sealable gasket (i.e., an improved gasket made of a thermoplastic material with ferromagnetic particles uniformly dispersed therein).

When a system comprising the gasket interposed between two thermoplastic tubes (or two thermoplastic pipes or hoses) is subjected to electromagnetic heating, the gasket becomes hot and transfers heat via conduction to the inner surface of the tube 12 and to the outer surface of tube 10 (i.e., the two surfaces of the two tubes (or two pipes or the pipe and the tube) which are in contact with the gasket). When the desired temperature ( a temperature just in excess of the melting point of the thermoplastic material comprising the gasket) is reached the electromagnetic heating is discontinued, and cooling of the thermoplastic material at the abutting surfaces of the gasket and the tubes causes a bond to form between the gasket and the tubes (or pipes or hoses) at the abutting surfaces without providing an opportunity for destructive heat to penetrate into the surrounding plastic tubes (or pipes). This results in a firm, strong, pressure tight, water tight bond or seal.

It is an object of the present invention to provide a gasket excellently adapted to provide an easily installed water tight seal capable of withstanding a pressure of at least 100 psia between two plastic tubes (or plastic pipes).

Figure 1:
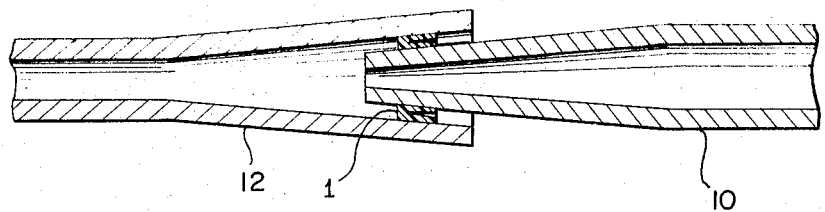
FIG. 1 shows, in cross section, two thermoplastic tubes (or pipes) bonded together with the gasket of this invention.
Figure 2:
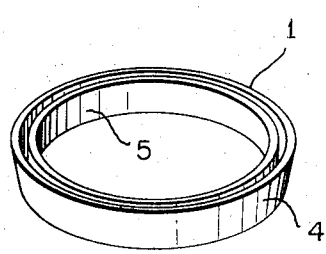
FIG. 2 shows the gasket of this invention.
Figure 3:
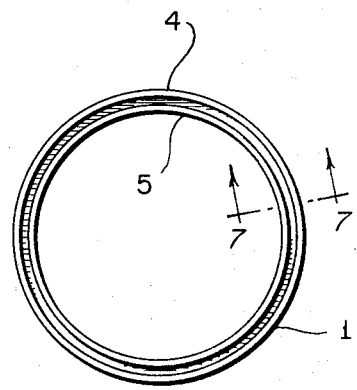
FIG. 3 shows another view of the gasket of this invention.
Figure 5:
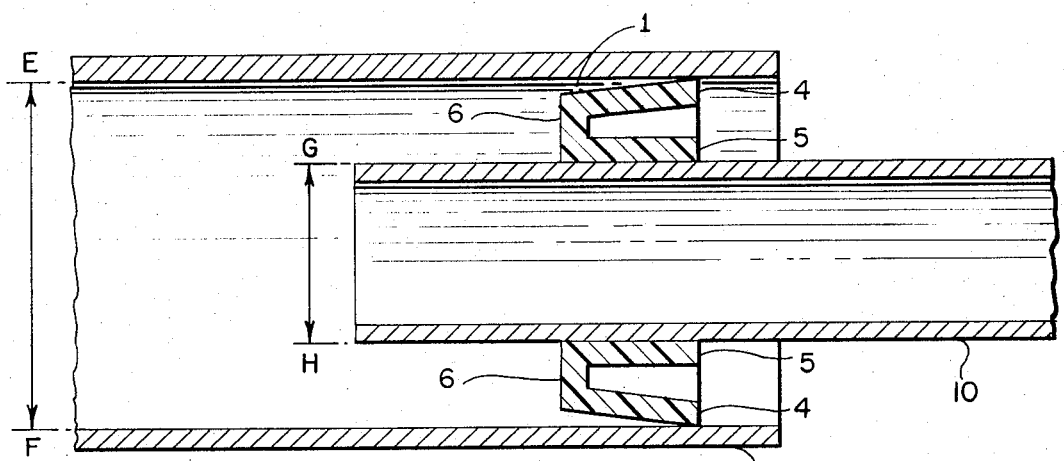
FIG. 5 shows, in cross section, two thermoplastic pipes (or tubes) bonded together with the gasket of this invention.

It is another object of this invention to provide a somewhat flexible gasket useful for sealing a first thermoplastic blow molded hose (or tube) within a second blow molded thermoplastic tube or hose (as represented by FIGS. 1, 5, and 9) in which the inside (internal) diameter—the length of line E–F of FIGS. 5 and 9—of the external hose (12 of FIGS. 1, 5, and 9) can vary by about 50–70 mils or more because of variations in wall thickness.

Other objects will be readily apparent to those skilled in the art.

The gasket of my invention is a wing (or winged) gasket—that is, a gasket comprising a ring base having an outer periphery and an inner periphery with a first wing attached to the ring base and extending upward and outward from the outer periphery and a second wing attached to the ring base and extending upward from the inner periphery. Said gasket is especially useful for sealing thermoplastic tubes (or hoses, or pipes) where the manufacturing tolerance of the diameter of one or both of said pipes (or tubes) of a given lot is so wide that one cannot obtain a seal with a conventional single thickness gasket.

Referring to FIGS. 5 and 9: It was found in one instance of actual practice that, where joining two plastic tubes (plastic hsoes) which were designed to be sealed together with a single thickness (ca 80 mils thick) thermal sealable (heat sealable gasket), the space tolerance between the tubes which is represented by the difference between lines E–F and G–H of said FIGS. 5 and 9 varied from about 80 mils to 160 mils—a variance too great to permit the use of the single thickness gasket. For example, if using an 80 mil single thickness gasket, the fit would be too loose at the outer tolerance (160 mils), and, if using a 160 mil single thickness gasket the pieces could not be assembled when the tolerance was only 80 mils. Neither could the problem be solved by using a 100 or 125 mil gasket because the resulting assembly would be too loose at the upper (160 mil) tolerance and assembly of the parts could not be made at the lower (80 mil) tolerance with such single thickness gasket.

Figure 4:
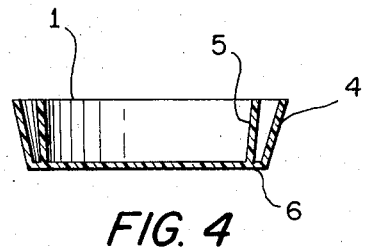
FIG. 4 shows, in cross section, the gasket of this invention.

The wing (or winged) gasket of this invention solves the problem of bonding together (via a heat sealable gasket) two plastic pipes (or tubes) having such widely varying tolerance in diameter because; (a) the outer wing (4 of FIGS. 4, 7, and 8) flares outward from the ring base (6 of said FIGS., i.e., the angle α of FIGS. 7 and 8 is less than 90°); and (b) if desired, the inner wing (5 of FIGS. 7, 8 and 4) can be perpendicular to the ring base (i.e., angle θ of FIGS. 7 and 8 is 90°, or the inner wing can flare inward from the ring base (i.e., the angle θ can be less than 90°), thereby accomidating a tolerance (the aforesaid difference between lines E–F and G–H of FIGS. 5 and 9) of up to 50–160 mils or more.

Figure 6:
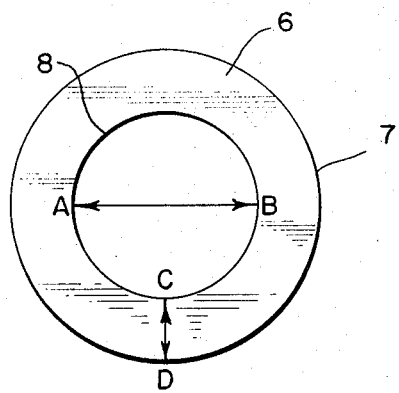
FIG. 6 shows the ring base of the gasket of FIG. 7.

Because of my disclosure, it will be readily apparent to those skilled in the art that said angles, the diameter of the hole (line A–B of FIG. 6) in the ring base, the distance represented by the line C–D fo FIGS. 6, 7, and 8, the thickness of the wings (4 and 5 of FIGS. 2, 3, 4, 5, 7, 8, and 9) and the length of said wings can varied in accord with, (a) the diameters of the tubes or pipes to be joined; and (b) variances or tolerances in the diameters of said tubes. Wings 4 and 5 generally have about the same thickness, but it is not necessary that they do. Generally the thickness of the ring base 6 is about the same as the thickness of the wings but said base can be thicker or thinner than either wing. Generally, the wings and the ring base have a thickness of about 15–25 or 20–30 mils (preferably about 20 mils) but they can be thinner or thicker as required by the particular circumstances and the conditions under which the gasket will be used. As noted supra, it is preferred that the outer edges of the bottom (or lower) portion of the ring base (the face of the ring base opposite the face from which the wings extend) be rounded as shown at 14 of FIG. 8. This makes it somewhat easier to fit the gasket into place where using it to connect (or bond) two tubes or hoses together as shown in FIG. 9. Various other modifications of the gasket of my invention will, because of my disclosure, be readily apparent to those of ordinary skill in the art. Gaskets having such modifications including the above-mentioned rounded outer edge of the bottom portion of the ring base are fully equivalent to the gaskets of my invention without such modification described elsewhere in this specification (including the above Summary and Preferred Embodiments). One such modification is to form the gasket in the shape of a "V" (see 15 of FIG. 8) rather than with a flat inner bottom (see 16 of FIG. 7).

The inner diameter of the ring base (the diameter of the hole in said base represented by the line A–B of FIG. 6) of the winged gasket of this invention is such that the gasket will generally fit more or less snugly over the inner plastic tube or plastic hose (i.e., tube 10 of FIGS. 1, 5, and 9) of the assembly which has the greatest outside diameter (the diameter represented by line G–H of FIGS. 5 and 9) permitted within a specified diameter tolerance.

The outer diameter of the ring base (the diameter represented by the sum of lines A–B and C–D of FIG. 6) is such that the gasket generally will fit more or less snugly into the outer tube (tube 12 of FIGS. 1, 5, and 9) which has the smmallest diameter (the diameter represented by line E–F of FIG. 5) permitted within the specified diameter tolerance.

Both wings (i.e., wing 4 and wing 5) are generally about the same length, but they can be of different lengths. The length of the first wing (the outer wing, wing 4, which extends upward and outward from the ring base) is such that for a given angle α of FIGS. 7 and 8) and at the maximum tolerance (or variance) in tube diameters (the aforesaid difference between the lengths of lines E–F and G–H of FIGS. 5 and 9) the first wing is in firm contact with the inner wall of the outer tube (tube 12 of FIGS. 1, 5, and 9).

To accomplish the establishment of a concentrated and specifically located heat zone by induction heating in the context of thermoplastic bonding in installing the gasket of this invention, it has been found that a gasket made of the electromagnetic adhesive compositions described above can be activated and a bond created by an induction heating system operating with an electrical frequency of its electromagnetic field of from about 5 to about 30 megahertz (megacycles) and preferably from about 5–11 megahertz to 20–27.12 or megahertz, said field being generated from a power source of from bout 1 to about 30 kilowatts, and preferably from about 2 to about 5 kilowatts. The electromagnetic field is generally applied for a period of time of less than about 2 minutes prefer from 0.4 to 45 seconds.

To insure good contact of the gasket of my invention with each of the two hoses (tubes) to be connected with said gasket, I prefer to apply pressure from an external source to the outside surface of the larger tube along the area where the gasket is positioned while heating the gasket (by induction heating) and for a short period thereafter to cause a firm and secure bond or seal between the gasket and said tubes.

I prefer to prepare the gasket of this invention by injection molding. However, gaskets of excellent quality can be prepared by thermoforming, compression molding, casting, and the like.

It is obvious to those skilled in the art that, where using a gasket of this invention to join two thermoplastic hoses, pipes, or tubes the thermoplastic material from which the gasket is constructed must be compatible with the tubes or pipes being joined. For example, if joining polypropylene tubes (or pipes) the gasket must be constructed of a material compatible with polypropylene. Hence, where bonding polypropylene tubes I use a gasket in which the thermoplastic material is polypropylene, where bonding polyethylene tubes I use a gasket in which the thermoplastic material is polyethylene, and where bonding Nylon tubes I use a gasket in which the thermoplastic material is Nylon. While the exact size of the ferromagnetic particles is not critical, they should be smaller than about 20 mesh (i.e., they should pass about a 20 mesh screen) and should be retained on about a 325 mesh screen. I generally prefer to use ferromagnetic particles passing about a 40 mesh screen and retained on about a 200 mesh screen.

The electromagnetic induction bonding system and improved electromagnetic adhesive compositions of U.S. Pat. No. 3,620,875 are applicable to the bonding of articles made from or of thermoplastic materials. The thermoplastics to which the gasket of the instant invention are particularly applicable include the polyolefins (especially polyethylene and polypropylene), polystyrene, polyamides such as Nylon, acetals such as Delrin, thermoplastic polycarbonates, thermoplastic-butadiene-styrene resins (ABS resins), thermoplastic polyvinyl chloride, thermoplastic copolymers, and all thermoplastic materials. Especially preferred thermoplastic polymers (thermoplastic materials) for preparing the gasket of this invention are those recited in Examples 1, 2, 3, 4, 5, 7, 9, 10, 11, 12, 13, and 14 of the aforesaid U.S. Pat. No. 3,620,875.

Preferred ferromagnetic particles are those recited in said U.S. Pat. No. 3,620,875. I generally prefer to use iron powder, nickel powder, nickel-iron powder, cobalt powder, and the like. The exact volume ratio of ferromagnetic particles to thermoplastic material (thermoplastic polymer is not critical; however, a quantity of ferromagnetic particles sufficient to obtain the needed heating must be present. I generally prefer to use about 10.5 -18.5 percent by volume—more preferably 13.5-15 percent by volume—of ferromagnetic particles. The most preferably percentage of ferromagnetic particles, that percentage which produces a very firm and secure water tight bond or seal (which will withstand a pressure of at least 100 psia) between the gasket and the tubes can, because of my disclosure, be readily determined by one of ordinary skill in the art.

Thermoplastic hoses, tubes, and pipes connected with the gasket of this invention have been used with excellent results to supply water to washing machines, to remove water from washing machines, to supply water to sprinkler systems for gardens and lawns, and to pipe water at a pressure in excess of 80 psia in a chemical plant.

It is understood that said invention is not limited by the following examples which are offered merely as illustrations; it is also understood that modifications can be made without departing from the spirit and scope of the invention.

EXAMPLE 1

Two polyethylene tubes (a small tube and a large tube) were joined together with a gasket of this invention.

The small tube had an outside diameter of about 1.25 inch and when inserted in the large tube there was a tolerance (corresponding to the difference between lines E–F and G–H of FIG. 5) of about 40 mils.

The following technique was used to join the two tubes:

A winged gasket of this invention was prepared by injection molding from a mixture iron powder passing a 40 mesh screen and retained on a 100 mesh screen and polyethylene (18.5 percent iron powder by volume). The gasket had an inner diameter (corresponding to line A–B of FIG. 6) such that the gasket would fit snugly over the small tube. Said gasket was placed on the small tube, and the small tube with the gasket thereon was inserted in the large tube to form an assembly represented by FIG. 5. The outer wing 4 of the gasket 1 was in contact with the inner surface of the outer tube 12. Bonding was accomplished by subjecting the portion of the connected tubes with the gasket therein in to electromagnetic induction heating for about 1.5 seconds, the induction heating unit having a rating of 3 kilowatts intensity and 5 megahertz (megacycles) frequency.

A secure water tight bond was formed which withstood a pressure of at least 100 psia.

EXAMPLE 2

The general procedure of Example 1 was repeated. However, in this instance the tubes were of polypropylene, the outside diameter of the small tube was about 1 inch, the tolerance (as explained supra) was 45 mils, and the gasket was made of an admixture of stainless steel (type 410) powder passing a 100 mesh screen and retained on a 200 mesh screen and polypropylene (14.5 percent stainless steel powder by volume).

Bonding time was 2.5 seconds using an induction heating unit having a rated intensity of 2.0 kilowatts and a frequency of 8 megacycles (megahertz).

A secure water tight seal which withstood a pressure in excess of 100 psia was obtained.

In a large number other runs the general procedure of Example 1, supra, was used to join thermoplastic tubes with the induction heat sealable gaskets of my invention. In each instance the tubes and the gasket were made from the same thermoplastic material. In each instance a water tight seal which would withstand a pressure of at least 100 psia resulted. A number of these runs are summarized in the following table.

| | | Composition of gasket | | | |
|---|---|---|---|---|---|
| Run No. | Composition of tubes | Thermoplastic material | Ferromagnetic material | Mesh size of ferromagnetic material | Percent by volume ferromagnetic material |
| | ABS | ABS | Iron | *200–325 | 11 |
| 1 | Polyvinyl chloride | Polyvinyl chloride | Nickel | 60–100 | 10.5 |
| 2 | Nylon | Nylon | Nickel-iron | 200–325 | 14 |
| 3 | Delrin | Delrin | Cobalt | 100–270 | 14.5 |
| 4 | do | do | Iron | 60–230 | 17 |
| 5 | Polycarbonate | Polycarbonate | Cobalt | 40–200 | 13.5 |
| 6 | Polystyrene | Polystyrene | do | 40–200 | 18.5 |
| 7 | Nylon | Nylon | Type 410 stainless steel | 100–200 | 13.8 |

*Plus 325 mesh and minus 200 mesh, i.e., it passed a 200 mesh screen but was retained on a 325 mesh screen.

As used herein the term "percent," means parts per hundred, and the term "parts" means parts by volume unless otherwise defined where used. Where determining percent by volume (and/or parts by volume) on the basis of weighed quantities of thermoplastic material and weighed quantities of ferromagnetic particles actual densities (rather than bulk densities) are used. Thus where preparing a mixture of polyethylene having an actual density of 0.92 and iron particles having an actual density of 7.9 the actual density of the polyethylene and the actual density of the iron are used in calculating the weight quantities to admix to product a mixture which is, for example, 14 percent iron particles by volume. No allowance or adjustment is made for possible expansion or shrinkage on admixing and molding to form the gasket.

As used herein the term "mil" means 0.001 inch; thus the term "20 mils" means 0.02 inch and the term "80 mils" means 0.08 inch.

As used herein the term "mesh," as applied to screen size, means US Standard mesh.

As used herein, the term "psia" means pounds per square inch absolute pressure.

The gasket of this invention can be used to bond two thermoplastic tubes, two thermoplastic pipes, or two thermoplastic hoses together. Likewise, said gasket can be used to bond a thermoplastic hose to a thermoplastic pipe or to a thermoplastic tube. Likewise, said gasket can be used to bond a thermoplastic tube and a thermoplastic pipe together. In each instance the resulting seal is water tight and the bonded system will withstand pressure in excess of 100 psia providing that the hose(s), tube(s), and pipe(s) respectively can withstand such pressure.

I claim:

1. A thermoplastic gasket made from a thermoplastic material having ferromagnetic particles uniformly dispersed therein, said gasket comprising a ring base having an outer periphery and an inner periphery, a first wing attached to the ring base and extending upward and outward from the outer eriphery, and a second wing attached to the ring base and extending upward from the inner periphery.

2. The thermoplastic gasket of claim 1 in which the angle $\alpha$ of FIGS. 7 and 8 is about 45°–85°.

3. The thermplastic gasket of claim 1 in which the angle $\theta$ of FIGS. 7 and 8 is about 45–90°.

4. The thermoplastic gasket of claim 1 in which the ferromagnetic particles pass about a 20 mesh screen and are retained on about a 325 mesh screen and comprise about 10.5–18.5 percent by volume of said gasket.

5. The thermoplastic gasket of claim 1 in which the bottom portion of the ring base is rounded.

6. In a heat sealable gasket comprising a thermoplastic material in which there is uniformly dispersed ferromagnetic particles, the improvement comprising the gasket having a ring base with an outer periphery and an inner periphery, a first wing attached to the ring base and extending upward and outward from the outer periphery, and a second wing attached to the ring base and extending upward from the inner periphery.

7. The thermoplastic gasket of claim 6 in which the angle $\alpha$ of FIGS. 7 and 8 is about 45°–85°.

8. The thermoplastic gasket of claim 6 in which the angle $\theta$ of FIGS. 7 and 8 is about 45°–90°.

9. The thermoplastic gasket of claim 6 in which the ferromagnetic particles pass about a 20 mesh screen and are retained on about a 325 mesh screen.

10. The thermoplastic gasket of claim 6 in which the ferromagnetic particles comprise about 10.5–18.5 percent by volume of the gasket.

* * * * *